United States Patent
Emoto et al.

(10) Patent No.: US 7,284,906 B2
(45) Date of Patent: Oct. 23, 2007

(54) EXHAUST APPARATUS AND CONTROL METHOD FOR SAME, AND VACUUM-USE HYDROSTATIC BEARING

(75) Inventors: Keiji Emoto, Tochigi (JP); Katsunori Onuki, Ibaraki (JP)

(73) Assignees: Canon Kabushiki Kaisha, Tokyo (JP); Hitachi High-Technologies Corporation, Tokyo (JP)

( * ) Notice: Subject to any disclaimer, the term of this patent is extended or adjusted under 35 U.S.C. 154(b) by 977 days.

(21) Appl. No.: 10/351,992

(22) Filed: Jan. 28, 2003

(65) Prior Publication Data

US 2003/0141667 A1    Jul. 31, 2003

(30) Foreign Application Priority Data

Jan. 31, 2002    (JP)    ............................. 2002-023747

(51) Int. Cl.
*F16C 33/06*    (2006.01)
(52) U.S. Cl. ...................................... 384/12
(58) Field of Classification Search .................. 384/12, 384/121, 123, 124, 119
See application file for complete search history.

(56) References Cited

U.S. PATENT DOCUMENTS 6,328,473 B1 * 12/2001 Tokushima et al. ........... 384/12
6,510,755 B1 *  1/2003 Higuchi et al. ............... 384/12

* cited by examiner

*Primary Examiner*—Lenard A. Footland
(74) *Attorney, Agent, or Firm*—Fitzpatrick, Cella, Harper & Scinto (57) ABSTRACT

An exhaust apparatus for a differential exhaust mechanism having a labyrinth seal and a plurality of vacuum pockets includes a differential exhaust system for evacuating the vacuum pockets and an exhaust system for evacuating a chamber of exhaust gas. The differential exhaust system and the exhaust system are connected by control valves that can be opened and closed, enabling communication between the vacuum pockets and the interior of the chamber to be opened and closed (or connected and disconnected) as well. The valves are opened when a vacuum is being formed inside the chamber or when a malfunction occurs in the exhaust system, thus connecting the vacuum pockets and the chamber and preventing excessive pressure from building up on the hydrostatic bearing.

13 Claims, 8 Drawing Sheets

EXHAUST APPARATUS AND CONTROL METHOD FOR SAME, AND VACUUM-USE HYDROSTATIC BEARING

FIELD OF THE INVENTION

The present invention relates to an exhaust apparatus for a differential exhaust mechanism and a control method for same, as well as a vacuum-use hydrostatic bearing provided with such differential exhaust mechanism.

BACKGROUND OF THE INVENTION

Figure 7:
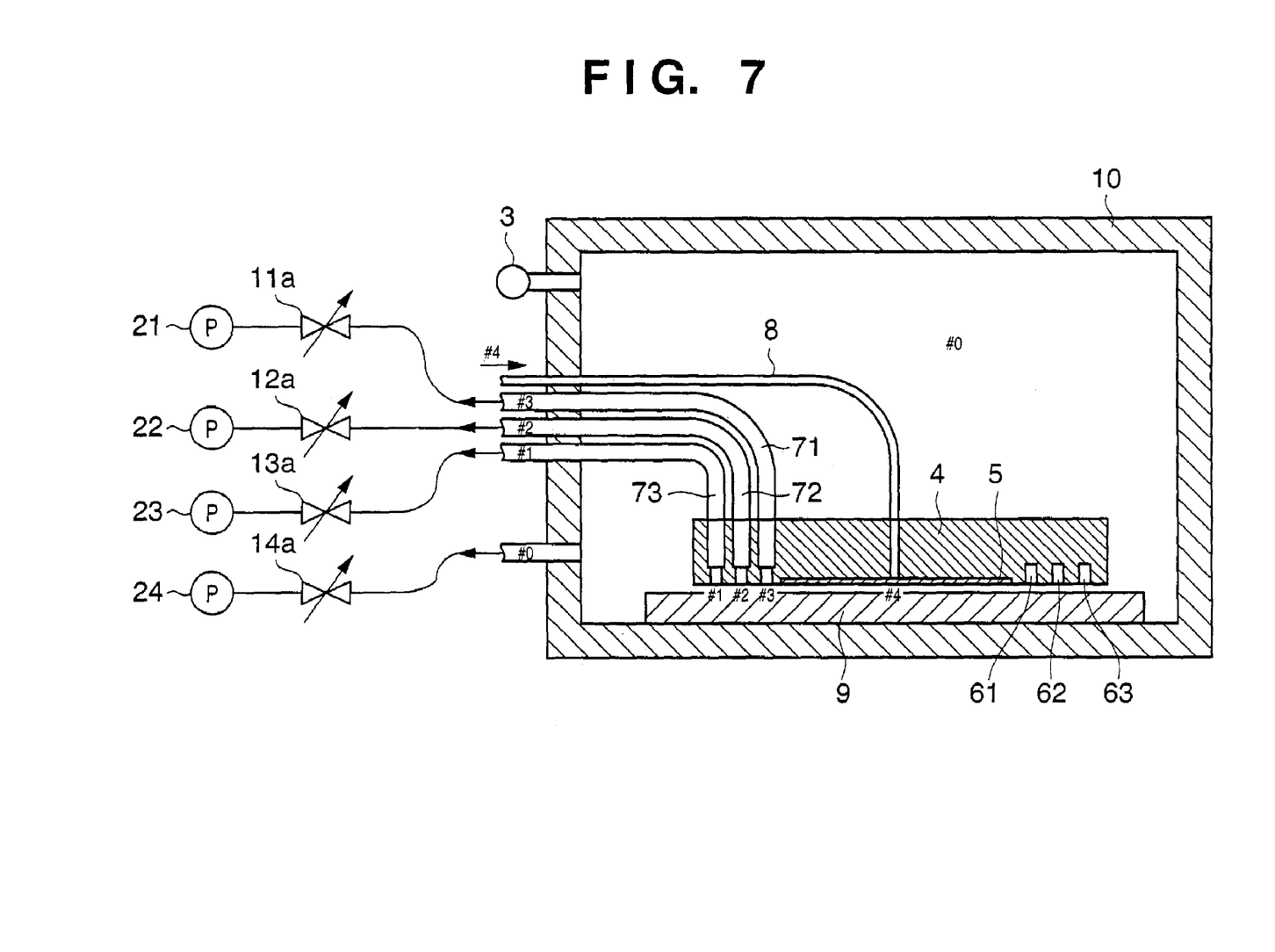
FIG. 7 is a diagram showing the general structure of a vacuum surface hydrostatic bearing using a differential exhaust apparatus installed inside a vacuum chamber.
Figure 8:
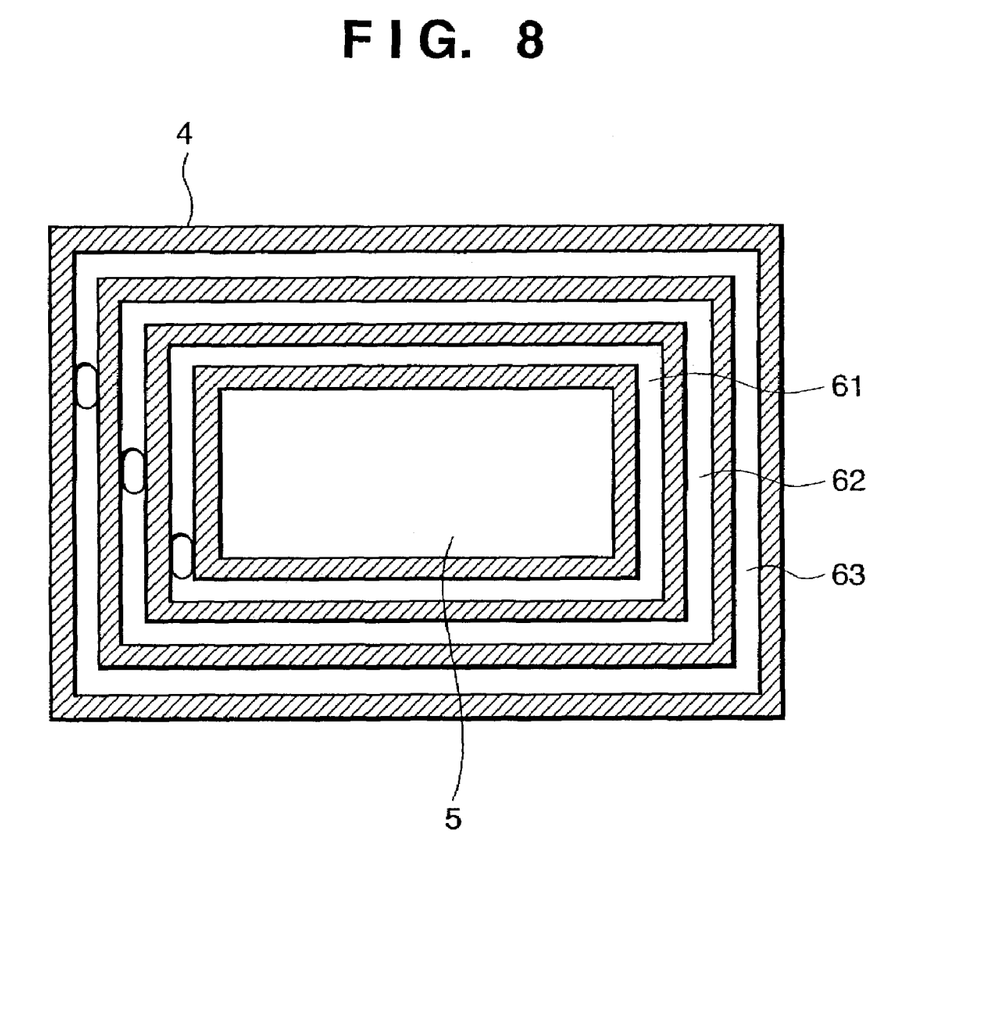
FIG. 8 is a diagram showing the differential exhaust apparatus (frame 4) shown in FIG. 7 viewed from the guide surface.

In order to facilitate an understanding of the present invention, a description is first given of the current state of the conventional art, with reference to FIG. 7 and FIG. 8.

FIG. 7 is a diagram showing the general structure of a vacuum surface hydrostatic bearing using a differential exhaust apparatus installed inside a vacuum chamber. FIG. 8 is a diagram showing the differential exhaust apparatus (frame) shown in FIG. 7 viewed from a guide surface.

As shown in the diagrams, a hydrostatic pad 5 is mounted on a frame 4, with a labyrinth seal surface and vacuum pockets 61-63 disposed so as to surround the hydrostatic pad 5. The labyrinth seal parts of a guide 9 and the frame 4 are disposed opposite each other across a slight gap. A gas is supplied to the hydrostatic pad 5 at #4 typically at a pressure of 1 atmosphere or more via an intake tube 8, enabling the hydrostatic pad 5 to act as a hydrostatic bearing. The gas so supplied, which may be He, $N_2$, air or some other suitable gas or gas mixture, passes through the slight gap between the labyrinth seal and the guide 9 and flows into a first vacuum pocket 61 and is expelled by a vacuum pump 21 via an exhaust tube 71. When the conductance at the labyrinth seal is very small the first vacuum pocket 61 is evacuated, so a large pressure differential between the pressure #4 of the bearing assembly (that is, the pressure of the hydrostatic pad 5 assembly) and the pressure #3 of the first vacuum pocket 61 can be generated.

In addition, gas that has not been fully exhausted via the exhaust tube 71 passes further through the slight gap between the labyrinth seal and the guide 9 and flows into a second vacuum pocket 62, where the gas is then exhausted by a second vacuum pump 22. By so doing, the pressure #2 at the second vacuum pocket 62 is reduced below the pressure #3 of the first vacuum pocket 61.

By similarly further reducing the pressure toward the periphery so that the pressure (#1) of an outermost vacuum pocket 63 approaches the pressure (#0) of the interior of a chamber 10, the leakage of gas from the hydrostatic pad 5 to the chamber 10 can be minimized. That is, the low-conductance effect at the labyrinth seal part and the exhaust effect of the vacuum pockets 61-63 are disposed so that the relative pressures of the constituent parts are #4>#3>#2>#1>#0, where the typical pressures #1 through #3 are much less than 10,000 Pa.

In addition, outside the chamber 10 the exhaust tubes 71-73 are connected to the vacuum pumps 21-23 either directly or via valves 11a-13a, so as to evacuate the vacuum pockets 61-63.

In the differential exhaust mechanism described above, the hydrostatic pad 5 and its associated members are designed to form a stable bearing where $\#0 \leq \#1 \leq \#2 \leq \#3 \leq \#4$ and where the difference between pressures #1-#3 and #0 is much less than 10,000 Pa. That is, the design is such that, under the foregoing conditions, a force in a direction pulling away from the guide surface 9 caused by the load rigidity of the hydrostatic pad 5 and the force of gravity and the like pressing the frame against the surface of the guide 9 are evenly balanced. The pressures #3-#1 exerted on the vacuum pockets 61-63 are virtually identical to the chamber pressure #0, and do not contribute to the force pulling away from the surface of the guide 9.

However, when the difference in pressure between #1-#3 and #0 is 10,000 Pa or greater, the vacuum pocket parts 61-63 also function as part of the bearing, with possible loss of bearing stability and oscillation. Similarly, because bearing stability deteriorates sharply when the hydrostatic pad 5 is not supplied with gas and the vacuum pockets 61-63 function as bearings, there is an additional risk that at even lower pressure differentials the frame 4 will oscillate vertically.

In order to prevent such oscillation, it is necessary to control the pressure of the vacuum pockets. However, coupling the exhaust directly to pumps 21-23 as in the conventional art makes it highly probably that the aforementioned pressure state will not be maintained when the pumps malfunction or when the apparatus is being started and the vacuum for the chamber 10 is being formed.

For example, when the pressure #0 inside the chamber is 1 Pa or less and the conditions described above are established and any one of the differential exhaust vacuum pumps 21-23 malfunctions, so that any one of pressures #1 through #3 approaches atmospheric pressure, the pressure differential with the pressure #0 inside the chamber increases to 10,000 Pa or more (that is, #0<<#1, #2, #3) and a bearing effect of the vacuum pockets 61-63 not considered at the design stage is generated, which can lead to a breakdown in bearing balance and consequent oscillation. In such a case, even if the malfunction of the vacuum pumps 21-23 is detected and the corresponding valves 11a through 13a are closed quickly, when oscillation begins it will not cease unless the pressure of the vacuum pockets 61-63 is reduced. Oscillation can occur easily, depending on the characteristics of the apparatus, during start-up and shut-down of the apparatus, that is, when gas is not being supplied to the hydrostatic pad 5.

Yet, given the conventional structure, it is difficult to maintain design pressures #0 through #4 when the apparatus is being started and the vacuum chamber 10 is being reduced to a vacuum from atmospheric pressure. That is, even if valves 11a-14a shown in FIG. 7 are connected and vacuum pumps 21-24 are all activated simultaneously, due to such factors as differences in exhaust capacity, the pressures #1-#3 inside the vacuum pockets 61-63 drop more rapidly than the pressure #0 inside the chamber such that #0>>#1, #2, #3 and the pressure differential exceeds 10,000 Pa. In such a case, in the vacuum pockets 61-63 parts, a force occurs that normally does not arise and that presses against the guide becomes excessive, posing a risk of deforming the structure that supports the frame 4. Likewise, evening when the valves 11a-13a connected to the differential exhaust are shut and only the chamber 10 is evacuated, because the gas can only move through the slight gap I the labyrinth seal a pressure differential of 10,000 Pa or more still occurs between the interior of the chamber 10 and the vacuum pockets 61-63 so that #0<<#1, #2, #3 and a force pulling away from the guide 9 begins to act, unbalancing the bearing and inviting oscillation. Usually the vacuum is formed without supplying gas to the hydrostatic pad 5, so the slight gap in the labyrinth seal becomes smaller still, inviting pressure differentials and further destabilizing the bearing so as to invite oscillation.

In other words, the problem with the conventional art is that, although under normal conditions there is no difficulty, when forming a vacuum in the chamber or when the exhaust system malfunctions (that is, the pump breaks down or the tubing fractures) there is a possibility that the pressure differential between the vacuum pockets 61-63 and the interior of the chamber 10 may exceed permissible design limits, yet the conventional art offers no structure to respond to such a situation.

SUMMARY OF THE INVENTION

Accordingly, the present invention is proposed to solve the above-described problem of the conventional art, and has as its object to provide an exhaust apparatus capable of preventing the occurrence of an excessive load on the hydrostatic bearing whenever a vacuum is being created inside the chamber or a problem occurs in the exhaust system.

The above-described object of the present invention is achieved by an exhaust apparatus for a differential exhaust mechanism having a labyrinth seal and a vacuum pocket, comprising:

exhaust means for exhausting the vacuum pocket;

a connective mechanism adapted to connect and disconnect the vacuum pocket with a peripheral space of the differential exhaust mechanism; and control means for controlling connection and disconnection of the connective mechanism.

In addition, the above-described object of the present invention is also achieved by an exhaust apparatus for a differential exhaust mechanism having a labyrinth seal and a vacuum pocket, comprising:

exhaust means for exhausting the vacuum pocket; and a connective mechanism adapted to connect and disconnect the vacuum pocket with a peripheral space of the differential exhaust mechanism depending on a pressure differential between the vacuum pocket and the peripheral space of the differential exhaust mechanism.

According to the invention described above, a hydrostatic bearing for use inside a vacuum is provided that combines the above-described exhaust apparatus and the hydrostatic bearing as well as a control method for controlling the above-described exhaust apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention, in which.

DETAILED DESCRIPTION OF THE PREFERRED EMBODIMENTS

Preferred embodiments of the present invention will be described in detail in accordance with the accompanying drawings.

First Embodiment

Figure 1:
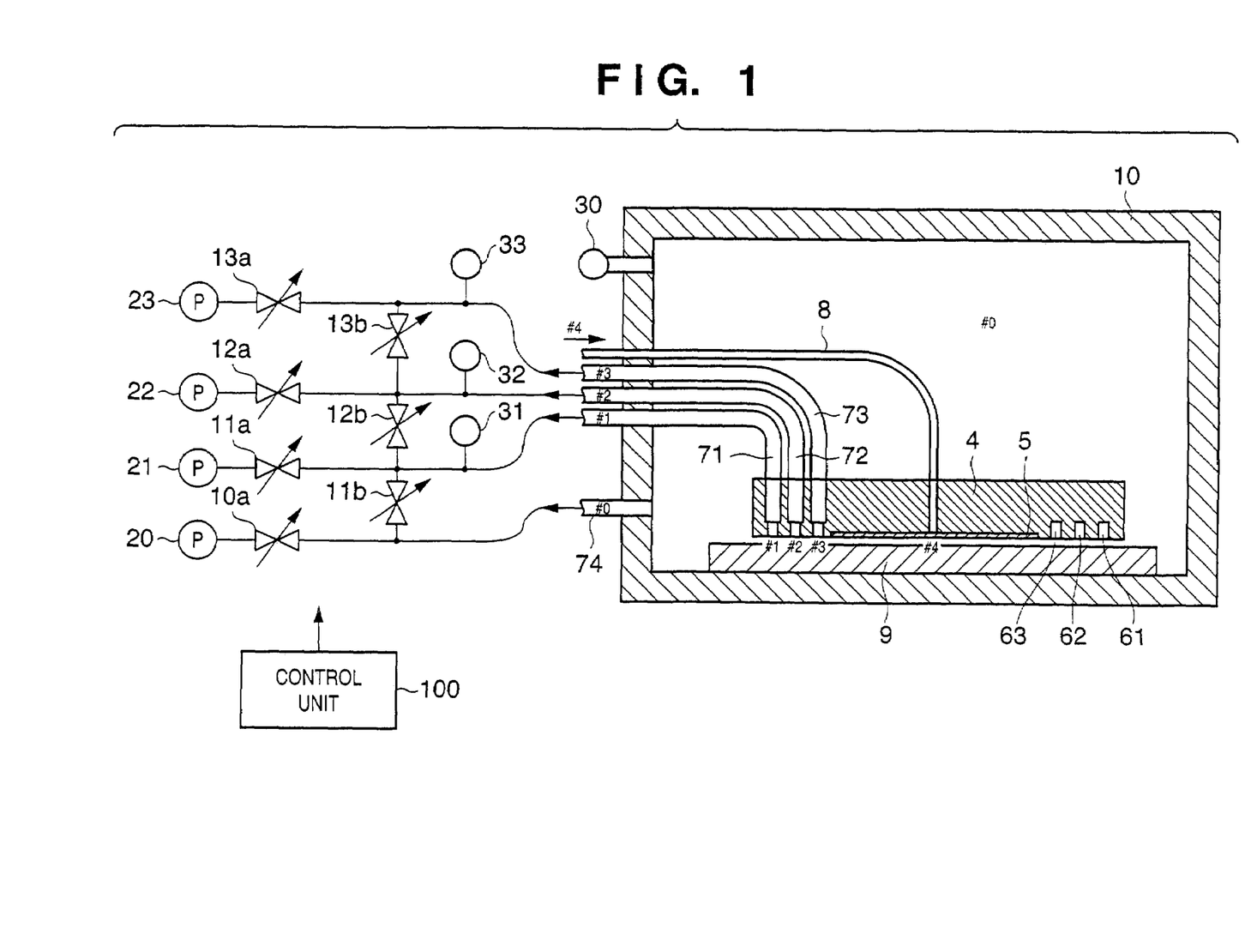
FIG. 1 is a diagram illustrating the structure of a hydrostatic bearing and exhaust apparatus according to a first embodiment of the present invention.

FIG. 1 is a diagram illustrating the structure of a hydrostatic bearing and exhaust apparatus according to a first embodiment of the present invention. In contrast to the apparatus structure shown in FIG. 8, the hydrostatic bearing and exhaust apparatus according to a first embodiment as shown in FIG. 1 connects exhaust tubes 71, 72 and 73, which connect to the differential exhaust system, to a chamber tube 74 via valves 11*b*, 12*b* and 13*b*, and provides a connective tube that communicates with the chamber 10. Vacuum gauges 31, 32 and 33 are provided for the differential exhaust systems, with vacuum gauge 30 provided on the vacuum chamber 10 in order to monitor the pressure differential between the vacuum pockets 61, 62 and 63 and the vacuum chamber 10 (that is, the peripheral space of the differential exhaust mechanism) for malfunctions. Reference numeral 100 is a control unit, which controls the operation (that is, the opening and the closing) of the valves as described below.

Figure 2:
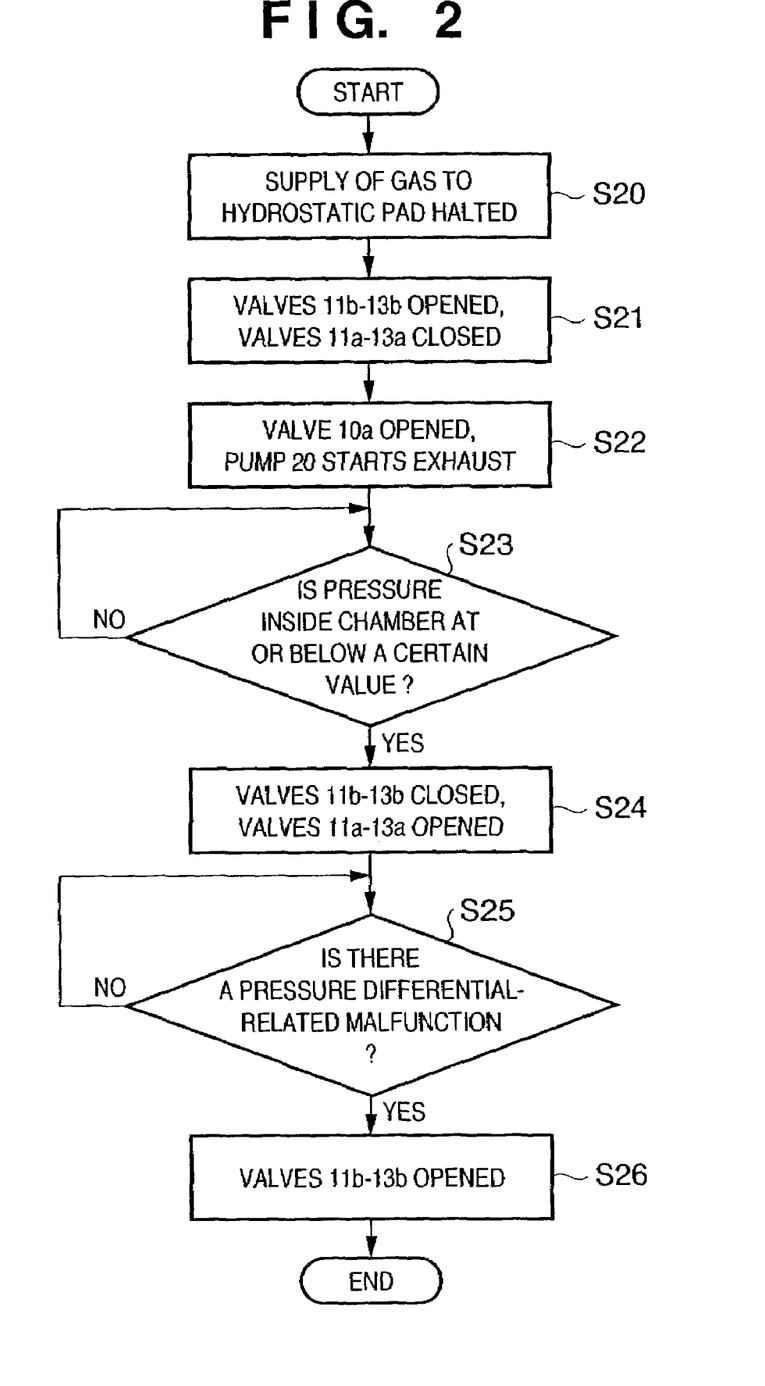
FIG. 2 is a flow chart illustrating a processing routine performed by a control unit in the exhaust apparatus according to the first embodiment of the present invention.

FIG. 2 is a flow chart illustrating a processing routine performed by a control unit in the exhaust apparatus according to the first embodiment of the present invention. It should be noted that, in FIG. 2, although the processes executed by the control unit 100 are described in terms of opening and closing the valves, in actuality, as can be appreciated by those of ordinary skill in the art, the control unit 100 may be made to perform other functions, such as, for example, controlling the driving of the pumps 20, 21, 22, 23.

When pumping air from the chamber 10 to form a vacuum, initially, the supply of gas to the hydrostatic pad 5 is halted (in a step S20) and the connective tube valves 11*b*-13*b* are all opened, after which the vacuum is created (in steps S21, S22). Valve 10*a*, which is connected to the pump 20, is of course opened, but valves 11*a*-13*a*, which are connected to the differential exhaust pumps 21-23, are closed. However, provided an exhaust system structure that does not allow a pressure differential to arise between the vacuum pockets 61-63 and the vacuum chamber 10 when forming the vacuum is possible (for example, when adopting the structure shown in embodiment 4 to be described later), the differential exhaust valves 11a-13a may be left open to assist in the formation of a vacuum in the chamber 10.

By forming the vacuum in the chamber in the manner described above, the pressure of the vacuum pockets 61-63 and the pressure inside the chamber 10 may be kept substantially identical at any given time. As a result, a pressure differential of 10,000 Pa or more does not arise between the vacuum pockets 61-63 and the chamber 10, and the adverse effects of an excessive force pressing the frame 4 against the surface of the guide 9 (such as deformation of the structure) are prevented from arising. Then, at a stage at which the pressure inside the chamber 10 has become sufficiently small (for example, 100 Pa or less), that is, when the pressure inside the chamber 10 has been reduced below a certain value (in a step S23), since an excessive pressure differential (that is, a pressure differential exceeding 10,000 Pa) between the chamber 10 and the vacuum pockets due to the creation of a vacuum inside the chamber 10 cannot arise, the connective tube valves 11b-13b can be closed and the differential exhaust valves 11a-13a can be opened (in a step S24).

Such valve control makes it possible to create a vacuum inside the chamber 10 without the frame 4 being pressed against the surface of the guide 9.

In addition, when the formation of a vacuum inside the chamber is to some extent completed and the connective tubes 11b-13b are closed and some sort of trouble causes the vacuum gauges 30-31 provided on the differential exhaust system and the chamber 10 to register pressures outside design range in at least one of the vacuum pockets 61-63, or when it is determined that such appears likely to happen (in a step S25), in order to prevent oscillation of the bearing (or to stop oscillation once it occurs) the connective tube valves 11b-13b are promptly opened (in a step S26). Such an arrangement enables the pressure inside the chamber 10 and the pressures inside the vacuum pockets 61-63 to be kept substantially the same under all conditions, removing the adverse effects of pressure inside the vacuum pockets 61-63. In addition, in order to detect a malfunction it is acceptable to use not only signals from the pressure gauges 30-33 but also malfunction indicator signals from the vacuum pumps 20-23 and/or signals from a bearing oscillation detection mechanism such as an accelerometer.

Here, the connective tube valves 11b-13b are the normal open type, so in a power outage the connective tube valves automatically open, thereby preventing oscillation of the bearing (frame 4). In addition, valves 10a-13a connected to, the pumps are the normal close type, so in a power outage an influx of air into the chamber 10 and the vacuum pockets 61-63 from the pumps 20-23 is prevented.

According to the first embodiment as described above, a structure is employed that allows the exhaust tubes 71-73 for differential exhaust and the interior of the chamber 10 that surrounds the differential exhaust mechanism to be connected to each other. That is, a mechanism is provided that enables the vacuum pockets and the exhaust mechanism periphery ambient atmosphere to be connected under pressure as needed. As a result, when forming a vacuum inside the chamber or when a malfunction occurs in the exhaust system, an excessive force can be prevented from acting between the guide 9 and the frame 4.

In addition, since the normal open type of valve is used for the connective tube valves 11b-13b, the apparatus is protected from damage due to a power outage because the vacuum pockets and the exhaust mechanism periphery ambient atmosphere are put into communication with each other.

In addition, vacuum gauges 30-33 are provided on the chamber 10 and on the differential exhaust tubes 71-73 and these valves are operate (opened and closed) according to the output signals from the vacuum gauges 30-33, so the apparatus can respond promptly and accurately to the detection of any malfunction in the exhaust system during operation. Specifically, when a malfunction is detected the connective tube valves 11b-13b are immediately opened, so the hydrostatic bearing apparatus can be securely protected. In addition, the hydrostatic bearing apparatus can also be protected in the event that oscillation of the bearing is detected by an accelerometer or the like.

Second Embodiment

As can be appreciated by those of ordinary skill in the art, although the first embodiment is described above as employing a flat hydrostatic bearing, in actuality the present invention can also be adapted to a radial hydrostatic bearing as well, as described below with respect to a second embodiment of the present invention.

Figure 3:
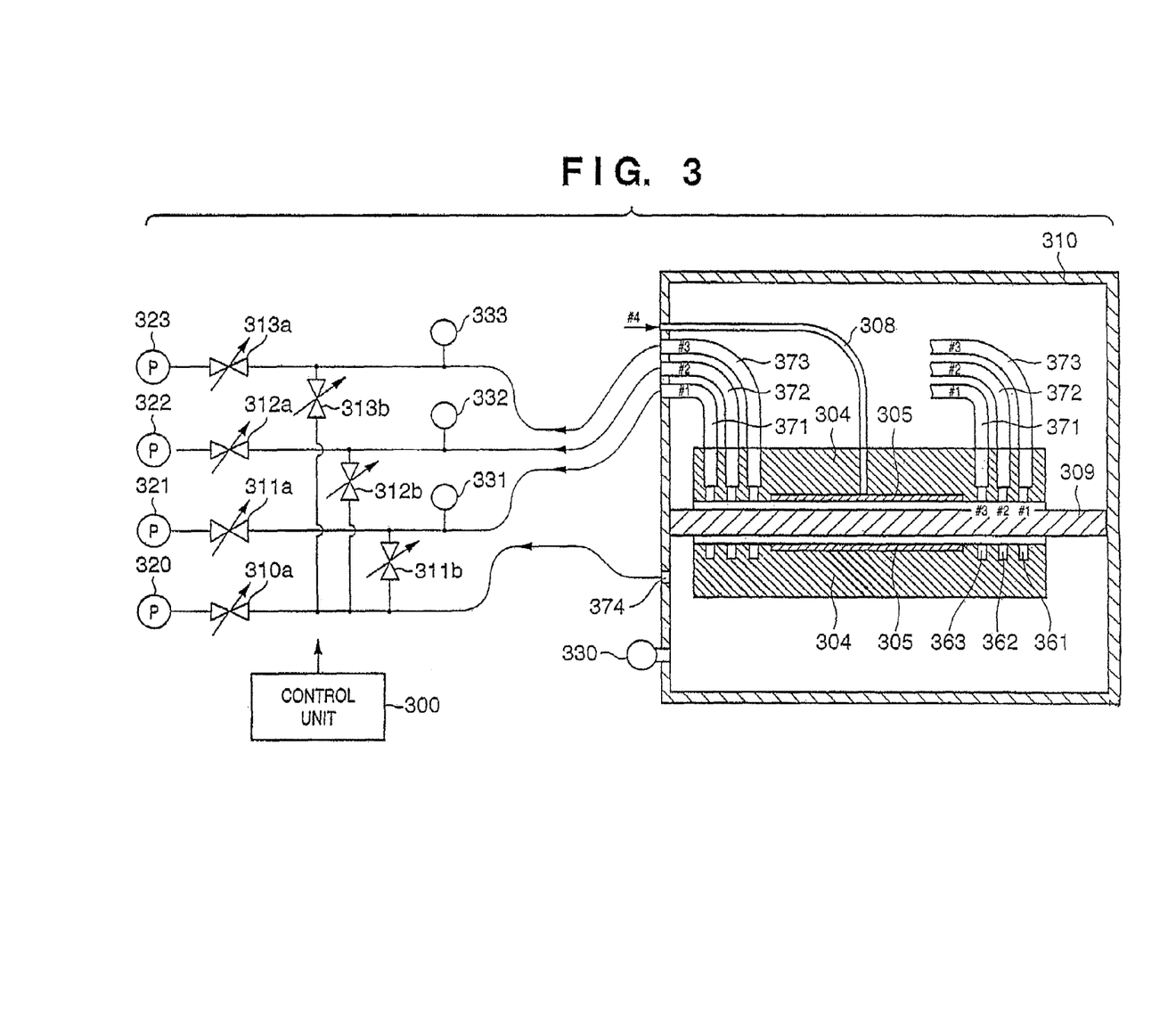
FIG. 3 shows an example of a vacuum radial hydrostatic bearing according to a second embodiment of the present invention.

FIG. 3 shows an example of a vacuum radial hydrostatic bearing according to a second embodiment of the present invention. What is shown in FIG. 3 is an example of a bearing for use inside a vacuum, in which a cylindrical guide 309, which is fixed in at the lateral ends, is restrained by a hydrostatic pad 305 in the radial direction. The frame 304, like the flat hydrostatic bearing described above, is provided with a labyrinth seal part as well as a hydrostatic pad 305 and vacuum pockets 361-363, each of which is arranged so as to cover the guide 309. The vacuum pockets 361-363 are each connected to vacuum pumps 321-323, respectively, via valves 311a-313a, so as to recover air supplied to the hydrostatic pad 5.

The second embodiment, like the first embodiment and for the same reasons, is provided with connective tube valves 311b-313b that connect tubes 371-373 with chamber tube 374, as well as vacuum gauges 330-333, with the operations of the valves controlled by a control unit 300. It should be noted that tubes 371-373 extend from both lateral ends of the frame 304, though they each become a single tube inside the chamber 310 or outside, and are connected to pressure gauges 331-333, valves 311b-313b, 311a-313a, and exhaust pumps 321-323.

As can be appreciated by those of ordinary skill in the art, the types of tubing described in the first embodiment can also be adapted to the second embodiment of the present invention, and vice-versa. The control unit 300 controls the valves according to the steps shown in FIG. 2 and described above, so a detailed description thereof is omitted here. It should be noted that, with the types of tubing used in the first embodiment and the second embodiment, there is no scarcely any difference in function. Any difference as exists is limited to the fact that the second embodiment can be made less susceptible to valve failure. For example, if valve 11b shown in FIG. 1 does not function, there is no communication with the vacuum pockets 361-363. However, with the tubing type depicted in FIG. 3, even if one valve malfunctions, that malfunction is limited to the corresponding vacuum pocket, so the impact of valve failure on the apparatus as a whole can be reduced.

Yet the configuration of the second embodiment of the present invention as described above also minimizes leakage from the hydrostatic pad 305 to the interior of the chamber 310 using the same principles of operation as the vacuum-use, flat-type hydrostatic bearing of the first embodiment of the present invention. In addition, like the first embodiment, the differential exhaust system is connected to the inside of the chamber 310 via connective tube valves 311b-313b, so if there is a pressure-related malfunction in the vacuum pockets 361-363 due to a breakdown of the exhaust system or if there is a possibility of a pressure-related malfunction during formation, the connective tube valves 11b-13b are closed to prevent such pressure-related malfunction from occurring.

Third Embodiment

A third embodiment of the present invention is described with reference to a structure that enables delivery of the exhaust gas from the hydrostatic pad 5 from a moving part (that is, the hydrostatic bearing frame) to a fixed part (that is, the guide).

Figure 4:
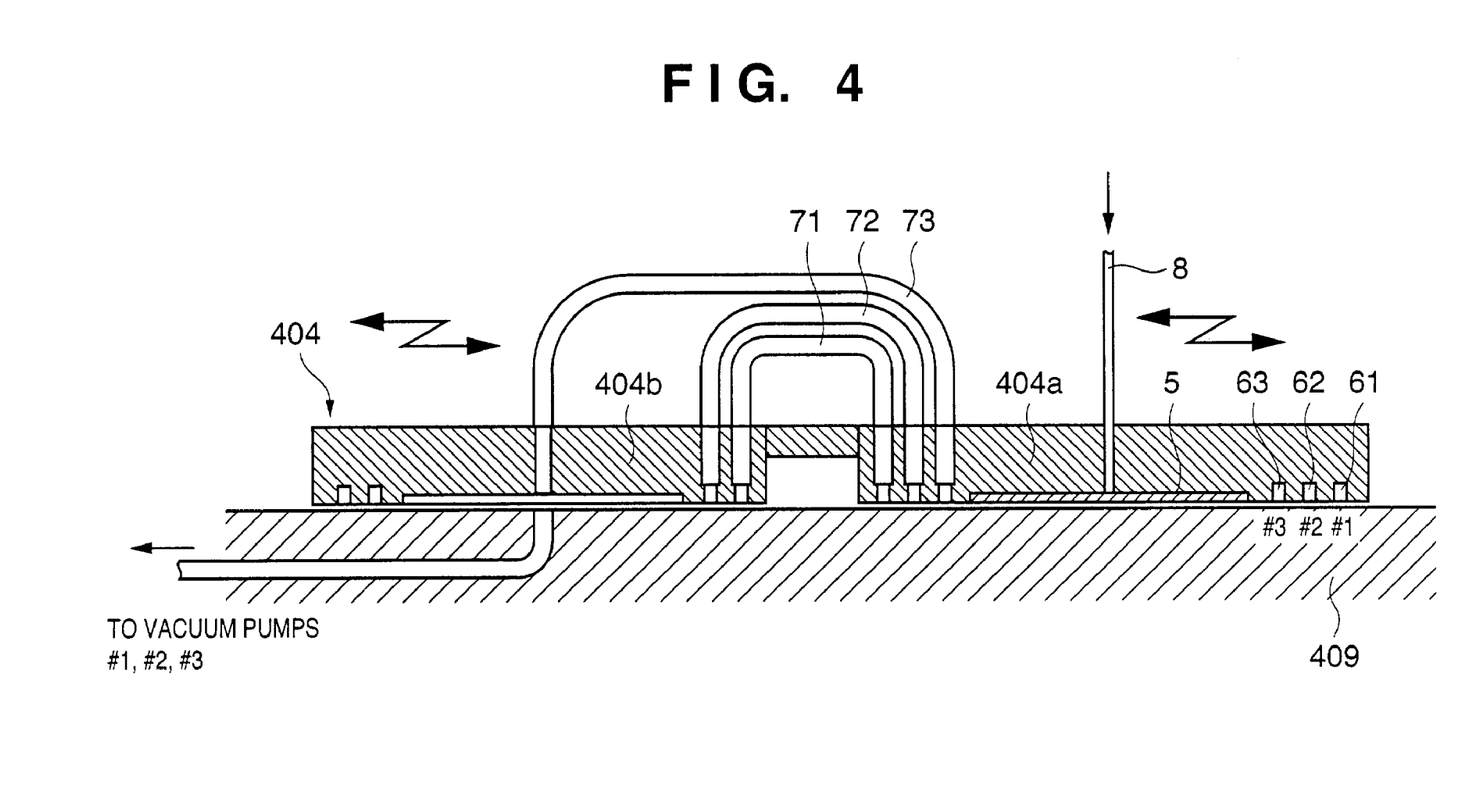
FIG. 4 is a diagram illustrating the structure of a frame and guide according to a third embodiment of the present invention.

FIG. 4 is a diagram illustrating the structure of a frame and guide according to a third embodiment of the present invention.

As shown in FIG. 4, a right lateral edge member 404a of the frame 404 is the vacuum-use flat-type hydrostatic bearing described with reference to the first embodiment. Here, a description is given of a structure in which exhaust from the right lateral edge member hydrostatic pad 5 is delivered from the movable right lateral edge member 404a of the frame 404 to the fixed guide 409.

Figure 5A:
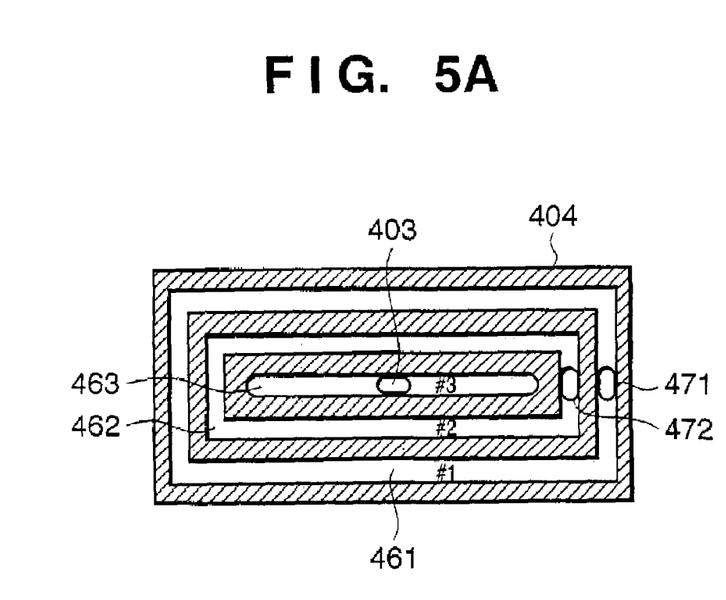
FIGS. 5A and 5B are diagrams showing a left lateral member of a frame as viewed from a surface of a guide and the surface of the guide as viewed from the left lateral member of the frame, respectively.
Figure 5B:
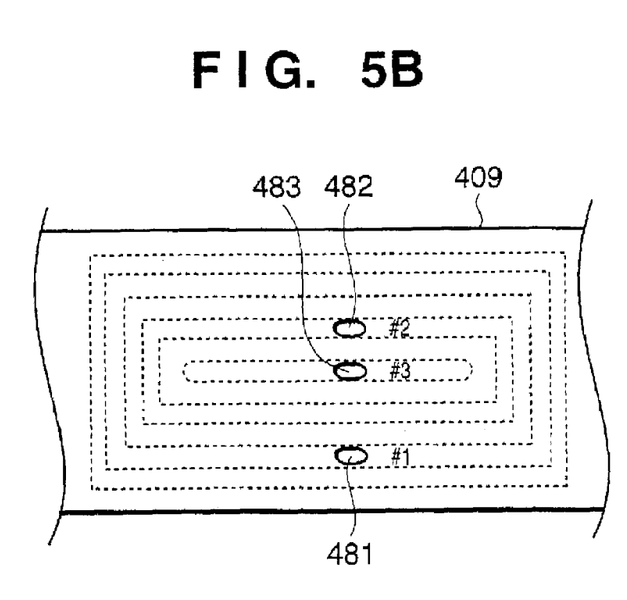

FIGS. 5A and 5B are diagrams showing a left lateral member 404b of the frame 404 as viewed from a surface of the guide 409 and the surface of the guide 409 as viewed from the left lateral member 404b of the frame 404, respectively.

The vacuum pockets 461-463 that evacuate the exhaust gas from the hydrostatic pad 5 are each connected to vacuum pockets 61-63 via tubes 71-73 and ports 471-473, respectively, and have pressures #1-#3, respectively, with #3 representing the greatest pressure and #1 the least pressure, thus generating a labyrinth seal effect and thereby minimizing leakage of gas to the interior of the chamber 10.

In addition, exhaust apertures 481, 482, 483 are formed on the surface of the guide 409, in portions that are always disposed opposite vacuum pockets 461-463. Then, so as to evacuate exhaust gas from the guide 409, vacuum pumps (not shown in the diagram) are connected to each of the exhaust apertures 481, 482, 483. Although not shown in FIGS. 5A and 5B, like the first embodiment and the second embodiment described above, the third embodiment connects the exhaust system of the vacuum pockets and the interior of the chamber (not shown in the diagram) to each other via connective tube valves (not shown in the diagram), so that the pressures therein are kept equal when the chamber vacuum is being formed or when there is a malfunction in the differential exhaust.

Thus, as described above, the third embodiment of the present invention makes it possible to evacuate the exhaust gas from the hydrostatic bearing frame 404 via the guide 409, thus making it possible to eliminate the tubing that connects the walls of the chamber and the frame of the hydrostatic bearing to each other. As a result of such elimination the hydrostatic bearing operates more smoothly.

It should be noted that the third embodiment described above contemplates movement in the direction of the axis 1 of the frame 404. However, by providing a mechanism for maintaining the labyrinth seal gap between the guide 409 and the left lateral edge member 404b of the frame 404, separating the right lateral edge member 404a and the left lateral edge member 404b into separate units so as to connect the two members 404a and 404b via a flexible tube, the right lateral edge member can move in two dimensions.

Fourth Embodiment

Figure 6:
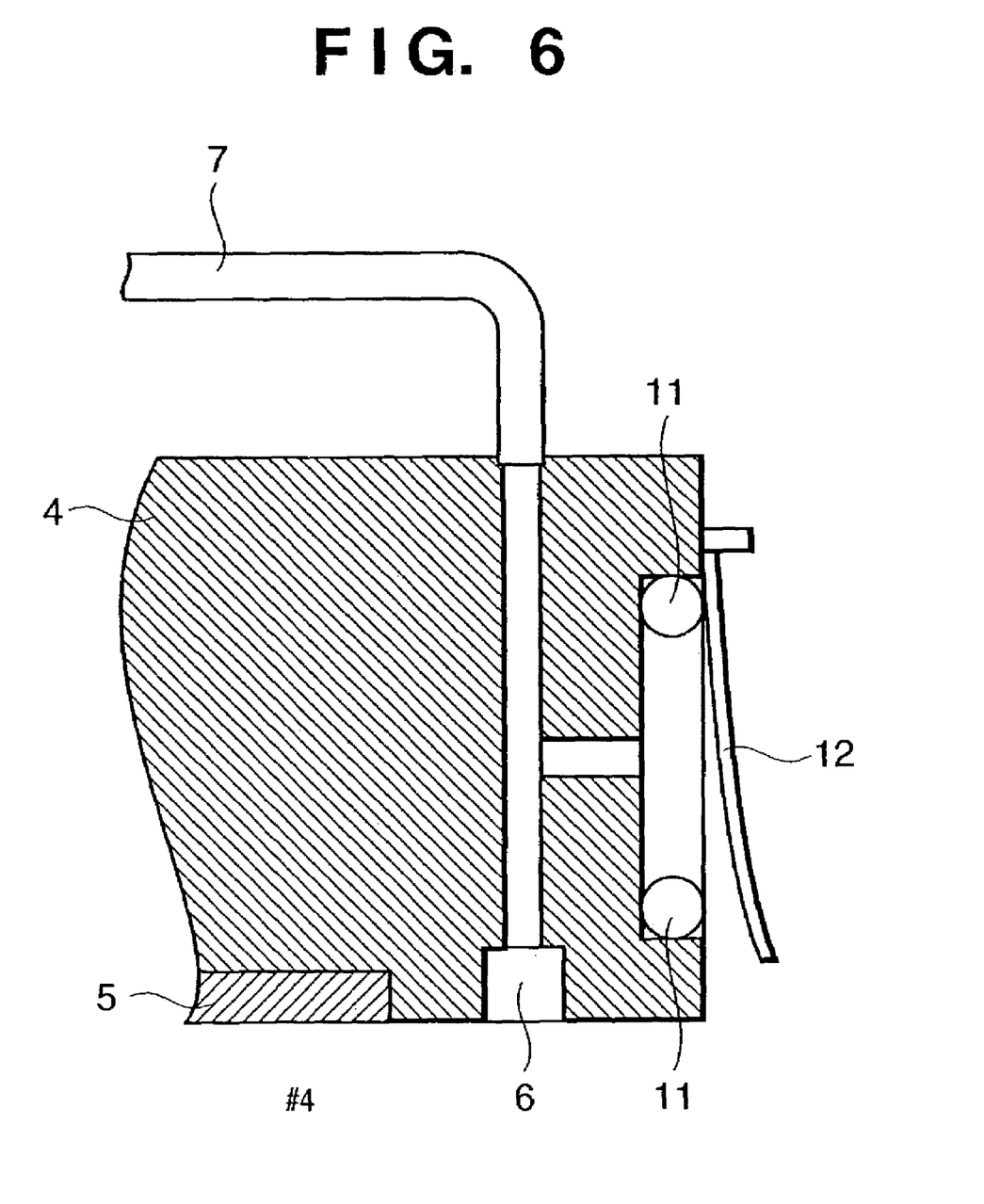
FIG. 6 is a diagram showing the structure of a differential exhaust mechanism and vacuum surface hydrostatic bearing according to a fourth embodiment of the present invention.

FIG. 6 is a diagram showing the structure of a differential exhaust mechanism and vacuum surface hydrostatic bearing according to a fourth embodiment of the present invention.

Unlike the first, second and third embodiments described above, the fourth embodiment of the present invention does not connect to the interior of the chamber via valves but instead employs a check valve to connect under pressure the vacuum pocket and the interior of the chamber when a certain pressure differential is reached, thus stabilizing the pressure at both the vacuum pocket and the interior of the chamber at virtually equivalent levels.

FIG. 6 depicts a check valve formed from an O-ring 11 and a valve 12. In this example, the check valve activates when the pressure of the vacuum pocket 6 exceeds that of the interior of the vacuum chamber and reaches a certain pressure differential value. Conversely, it is also possible to set the check valve to activate when the vacuum chamber pressure exceeds that of the vacuum pocket and reaches a certain pressure differential value.

Of course, it is desirable to mount the above-described two types of check valves at points that communicate with the vacuum pockets in order to be able to cope with both types of situations.

Thus, as described above, the fourth embodiment of the present invention, by providing check valves at places that communicate, under pressure, with the vacuum pockets, prevents excessive force from being brought to bear on the hydrostatic bearing when forming a vacuum in the chamber or when a problem occurs in the exhaust system. The use of check valves is particularly effective when used in combination with hydrostatic bearings.

The embodiments described above, by providing a mechanism that can connect as necessary the vacuum pocket and the ambient atmosphere of the differential exhaust mechanism periphery under pressure, can either prevent or reduce the adverse effects of excessive force being brought to bear on the vacuum pockets (that is, bearing oscillation, structural deformation, etc.).

The first, second and third embodiments in particular greatly simplify the structure of the apparatus, by using valves to connect the exhaust tubes for the differential exhaust with the chamber tubing that communicates under pressure with the interior of the vacuum chamber that surrounds the differential exhaust mechanism. Moreover, by using normal open type valves, the connective tube valves can be kept open during a power failure when power is not being supplied to the apparatus, thus preventing damage due to excess pressure.

In addition, by providing pressure measurement means (for example, a vacuum gauge) on the chamber and on the differential exhaust tubes, the valves can be operated promptly and accurately in response to the output of the pressure measurement means. Moreover, by operating the connective tube valves according to detection results furnished by detection means (such as an accelerometer) for detecting oscillations of the differential exhaust mechanism, the apparatus can responds promptly and accurately to such oscillations. It should be noted that the valves are set to open in the event of an apparatus malfunction, and, as can be appreciated by those of ordinary skill in the art, information supplied by malfunction detection means other than those specifically described above can also be employed as appropriate.

According to the fourth embodiment of the present invention as described above, by providing a differential pressure regulating valve at a location that communicates under pressure with the vacuum pockets, the apparatus can cope with a pressure-related malfunction in the vacuum pockets. Such a configuration can be particular effective when used in combination with hydrostatic bearings, which are susceptible to oscillation.

Thus, as described above, the present invention makes it possible to prevent the accumulation of excessive pressure on the hydrostatic bearing when evacuating the interior of the chamber to form a vacuum or in the event of a malfunction in the exhaust system.

The present invention is not limited to the above embodiments, and various changes and modifications can be made within the spirit and scope of the present invention. Therefore, to apprise the public of the scope of the present invention, the following claims are made.

What is claimed is:

1. An exhaust apparatus for a differential exhaust mechanism having a labyrinth seal and a vacuum pocket, comprising:
   exhaust means for exhausting the vacuum pocket;
   a connective mechanism adapted to connect and disconnect the vacuum pocket with a peripheral space of the differential exhaust mechanism; and
   control means for controlling connection and disconnection of the connective mechanism.

2. The exhaust apparatus of claim 1, further comprising a chamber that surrounds the differential exhaust mechanism and forms the peripheral space, wherein the connective mechanism connects an exhaust passage of the exhaust means to the chamber via a valve whose operation is controlled by the control means.

3. The exhaust apparatus of claim 2, wherein the valve is a normal open type.

4. The exhaust apparatus of claim 2, wherein the control means places the valve in a connective state from commencement of formation of a vacuum inside the chamber to attainment of a certain vacuum degree inside the chamber.

5. The exhaust apparatus of claim 2, wherein the control means comprises pressure measurement means for measuring pressure inside the chamber and pressure in the vacuum pocket and controls the operation of the valve according to results of pressure measurements obtained by the pressure measurement means.

6. The exhaust apparatus of claim 5, wherein the control means opens the valve when the results of pressure measurements obtained by the pressure measurement means indicate that a pressure differential between the inside of the chamber and the vacuum pocket exceeds a certain value.

7. The exhaust apparatus of claim 2, wherein the control means comprises oscillation detection means for detecting oscillation of the differential exhaust mechanism and controls the operation of the valve according to oscillation detection results obtained by the oscillation detection means.

8. The exhaust apparatus of claim 7, wherein the control means closes the valve when the oscillation detection means detects oscillation of the differential exhaust mechanism.

9. The exhaust apparatus of claim 2, wherein the control means closes the valve when a malfunction of the apparatus is detected including a malfunction of the differential exhaust mechanism.

10. An exhaust apparatus for a differential exhaust mechanism having a labyrinth seal and a vacuum pocket, comprising:
    exhaust means for exhausting the vacuum pocket; and
    a connective mechanism adapted to connect and disconnect the vacuum pocket with a peripheral space of the differential exhaust mechanism depending on a pressure differential between the vacuum pocket and the peripheral space of the differential exhaust mechanism.

11. The exhaust apparatus of claim 10, wherein the connective mechanism provides a check valve on a passage that connects the vacuum pocket and the peripheral space.

12. A hydrostatic bearing for inside a chamber, formed by combining the exhaust apparatus of claim 11 with a hydrostatic bearing.

13. A control method for controlling an exhaust apparatus, the apparatus comprising:
    exhaust means for exhausting a vacuum pocket, the exhaust means being connected to a differential exhaust mechanism having a labyrinth seal and the vacuum pocket; and
    a connective mechanism for connecting and disconnecting the vacuum pocket with a peripheral space of the differential exhaust mechanism,
    the control method comprising:
    a control step of connecting and disconnecting the connective mechanism depending on the state of the exhaust apparatus.

* * * * *